(12) United States Patent
Wakimoto

(10) Patent No.: US 12,286,182 B2
(45) Date of Patent: Apr. 29, 2025

(54) STRADDLED VEHICLE

(71) Applicant: YAMAHA HATSUDOKI KABUSHIKI KAISHA, Iwata (JP)

(72) Inventor: Yojiro Wakimoto, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 543 days.

(21) Appl. No.: 17/519,662

(22) Filed: Nov. 5, 2021

(65) Prior Publication Data
US 2022/0177063 A1     Jun. 9, 2022

(30) Foreign Application Priority Data
Dec. 4, 2020   (JP) ................................. 2020-202192

(51) Int. Cl.
*B62J 1/28*     (2006.01)
*B62J 1/08*     (2006.01)
*B62J 9/14*     (2020.01)

(52) U.S. Cl.
CPC . *B62J 1/28* (2013.01); *B62J 1/08* (2013.01); *B62J 9/14* (2020.02)

(58) Field of Classification Search
CPC ......... B62J 1/08; B62J 1/28; B62J 9/14; B62J 9/30; B62H 5/006; E05B 15/10; E05B 17/047; E05B 57/00; E05B 63/0013; E05B 63/12; E05B 83/16; E05B 83/24; E05B 83/28; E05B 83/30; E05B 83/32; E05C 9/08; Y10T 292/081; Y10T 292/0829; Y10T 292/0831; Y10T 292/0851; Y10T 292/0854; Y10T 292/0857; Y10T 292/0862

USPC ....................... 180/219; 280/202; 70/84, 137
See application file for complete search history.

(56) References Cited

U.S. PATENT DOCUMENTS

| 3,779,597 A | * | 12/1973 | Uchida | B62J 9/14 |
| | | | | 297/188.1 |
| 2006/0180373 A1 | * | 8/2006 | Hanagan | B62K 11/00 |
| | | | | 180/219 |
| 2007/0068201 A1 | * | 3/2007 | Fujimoto | E05B 17/2003 |
| | | | | 70/57 |

(Continued)

FOREIGN PATENT DOCUMENTS

| EP | 2030879 A1 * | 3/2009 | ............ B62H 5/006 |
| JP | 2004011257 A | 1/2004 | |

(Continued)

*Primary Examiner* — Christopher B Wehrly
(74) *Attorney, Agent, or Firm* — Rabin & Berdo, P.C.

(57) ABSTRACT

A straddled vehicle includes a vehicle frame, a main seat, a tandem seat, an accommodation portion provided below the tandem seat, a seat lock mechanism attached to a bottom portion of the tandem seat, and a lock portion attached to the vehicle frame in a front portion of the accommodation portion. The seat lock mechanism includes: a key cylinder that has a main body having a key insertion hole, and an arm pivotable around the main body by a pivoting operation made by a key; and a hook member pivotable along with the pivoting of the arm. The hook member includes a first hook portion engageable with the arm, at least one second hook portion engageable with the lock portion, and a pivoting restriction portion configured to restrict the hook member from pivoting in a state where the key insertion hole does not have the key inserted therein.

2 Claims, 10 Drawing Sheets

(56) References Cited

U.S. PATENT DOCUMENTS

| | | | |
|---|---|---|---|
| 2015/0321717 A1* | 11/2015 | Ito | B62J 1/28 |
| | | | 280/281.1 |
| 2018/0073285 A1* | 3/2018 | Yamasaki | E05B 85/06 |
| 2020/0047841 A1* | 2/2020 | Luckjohn | B62J 1/00 |

FOREIGN PATENT DOCUMENTS

| | | |
|---|---|---|
| JP | 2007062561 A | 3/2007 |
| JP | 2010036596 A | 2/2010 |
| WO | 2016170688 A1 | 10/2016 |

* cited by examiner

STRADDLED VEHICLE

CROSS-REFERENCE TO RELATED APPLICATIONS

This application claims priority from a Japanese Patent Application No. 2020-202192, filed on Dec. 4, 2020, the content of which is incorporated herein by reference.

BACKGROUND

1. Technical Field

The present invention relates to a straddled vehicle.

2. Description of the Related Art

A motorcycle may be so arranged that a main seat or a tandem seat is made detachable and a vehicle-mountable item such as a battery or the like is located, or a small accommodation space is provided, below the main seat or the tandem seat. In such a case, a mechanism (device) that secures the seat to a vehicle frame is provided in order to prevent the vehicle-mountable item located below the seat or an item accommodated in the accommodation space from being stolen.

Japanese Laid-Open Patent Publication No. 2004-11257 discloses a key lock device that secures a tandem seat to a vehicle frame. The key lock device includes a lock mechanism located at a rear end of the vehicle frame and a key cylinder provided to operate the lock mechanism. The lock mechanism and the key cylinder are coupled to each other by a cable. The key lock device described in Japanese Laid-Open Patent Publication No. 2004-11257 involves an undesirable possibility that if somebody having no key inserts a tool such a wire or the like through a gap around the cable, hooks a tip of the wire on the cable and pulls the wire, the locking state of the lock mechanism is unlocked.

A structure that may prevent such a misconduct is proposed in each of Japanese Laid-Open Patent Publications Nos. 2007-62561 and 2010-36596.

Japanese Laid-Open Patent Publication No. 2007-62561 discloses a motorcycle including a seat lock mechanism that secures a tandem seat to a rear frame and a key device provided to actuate the seat lock mechanism by a key operation. The seat lock mechanism and the key device are coupled to each other by a cable. In the motorcycle described in Japanese Laid-Open Patent Publication No. 2007-62561, a guard body that prevents an access to the cable from outside the vehicle body is provided in a component located in the vicinity of the seat lock mechanism (e.g., a bracket supporting the key device).

Japanese Laid-Open Patent Publication No. 2010-36596 discloses a motorcycle including a seat locking mechanism that locks the seat and an unlocking mechanism that unlocks the locking state of the seat locking mechanism. In this motorcycle, a vehicle cover includes an extending portion extending to a position below the seat, and the extending portion encloses the seat locking mechanism.

SUMMARY

The techniques proposed in Japanese Laid-Open Patent Publications Nos. 2007-62561 and 2010-36596 each prevent a theft by changing the shape of a component located in the vicinity of the seat lock mechanism (seat locking mechanism) such that the component covers the seat lock mechanism. It is also conceivable to prevent a theft by newly providing a component that covers the seat lock mechanism, instead of changing the shape of the component located in the vicinity of the seat lock mechanism.

However, these techniques unavoidably increase the cost and the weight as a result of changing the shape of the component located in the vicinity of the seat lock mechanism or as a result of newly providing a component.

The present invention made in light of the above-described problems has an object of providing a straddled vehicle capable of preferably preventing a misconduct to a seat lock mechanism (unpermitted operation on the seat lock mechanism by somebody having no key) without being increased in the cost or the weight.

This specification discloses a straddled vehicle described below.

[Item 1] A straddled vehicle, including:
- a vehicle frame;
- a main seat located above the vehicle frame;
- a tandem seat located above the vehicle frame and to the rear of the main seat;
- an accommodation portion provided below the tandem seat;
- a seat lock mechanism attached to a bottom portion of the tandem seat, the seat lock mechanism detachably securing the tandem seat to the vehicle frame; and
- a lock portion attached to the vehicle frame in a front portion of the accommodation portion, the lock portion being engageable with a part of the seat lock mechanism, wherein the seat lock mechanism includes:
- a key cylinder including a main body having a key insertion hole, and an arm protruding from the main body, the arm being pivotable, with the main body acting as the pivoting center, by a pivoting operation made by a key inserted into the key insertion hole, and
- a hook member pivotable along the pivoting of the arm of the key cylinder, the hook member including a first hook portion engageable with the arm and at least one second hook portion engageable with the lock portion, and wherein the hook member further includes a pivoting restriction portion restricting the hook member from pivoting in a state where the arm is not pivotable.

In the straddled vehicle in an embodiment of the present invention, the hook member of the seat lock mechanism includes the pivoting restriction portion restricting the hook member from pivoting in a state where the arm of the key cylinder is not pivotable. Therefore, the hook member may be prevented from being pivoted forcibly with no use of the key. The straddled vehicle in an embodiment of the present invention does not require the shape of a component located in the vicinity of the seat lock mechanism to be changed, or to newly provide a component, in order to prevent the forcible pivoting of the hook member. Therefore, an increase in the cost or the weight may be suppressed. In addition, the seat lock mechanism is provided on the side of the tandem seat, instead of on the side of the vehicle body. Therefore, the accommodation portion is accessible more easily in a state where the tandem seat is removed from the vehicle frame, and is usable more effectively. Furthermore, the hook member is structured to pivot, not to slide linearly, along with the pivoting of the arm. Therefore, the ratio between the distance from the first hook portion to the pivoting shaft and the distance from the second hook portion to the pivoting shaft may be adjusted, so that the pivoting range of the second hook portion in accordance with the pivoting of the arm is appropriately set. Hence, the second hook portion and the lock portion may be engaged with, or disengaged from, each other in a preferred manner.

[Item 2] The straddled vehicle of item 1, wherein the pivoting restriction portion is a portion extending to be located on the side opposite to the first hook portion with respect to the arm.

Specifically, the pivoting restriction portion may be a portion extending to be located on the side opposite to the first hook portion with respect to the arm. When it is attempted to forcibly pivot the hook member, the pivoting restriction portion extending as described above contacts the arm of the key cylinder, and therefore, the hook member may be restricted from pivoting.

One non-limiting and exemplary embodiment provides a straddled vehicle capable of preferably preventing a misconduct to the seat lock mechanism (unpermitted operation on the seat lock mechanism by somebody having no key) without being increased in the cost or the weight.

DETAILED DESCRIPTION

Hereinafter, an embodiment of the present invention will be described with reference to the attached drawings. The present invention is not limited to the following embodiment.

Figure 1:
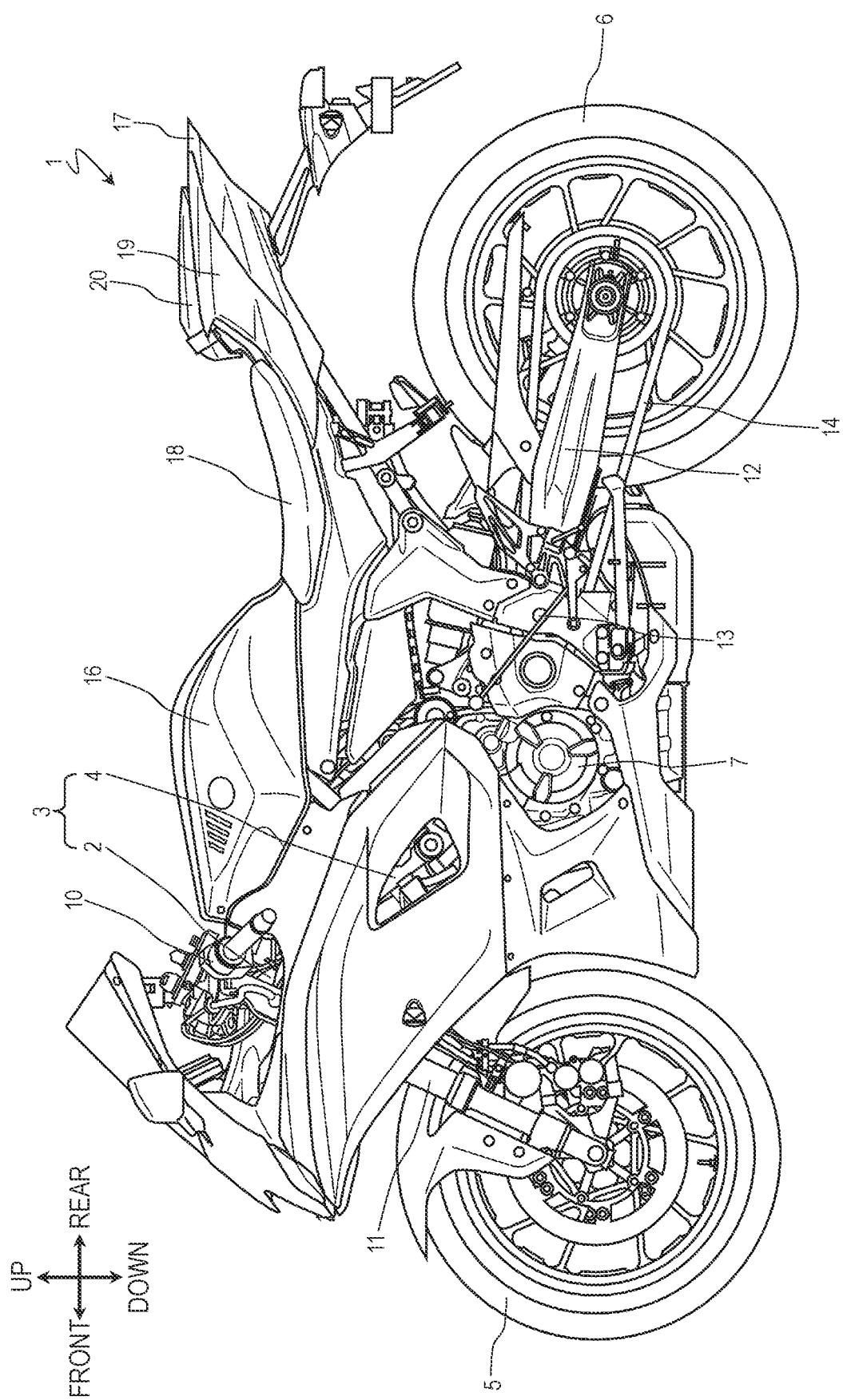
FIG. 1 is a left side view schematically showing a motorcycle 1 according to an embodiment of the present invention.

With reference to FIG. 1, a motorcycle 1 according to an embodiment of the present invention will be described. FIG. 1 is a left side view schematically showing the motorcycle 1. The motorcycle 1 shown in FIG. 1 is of an on-road type. A motorcycle according to an embodiment of the present invention is not limited to an on-road type motorcycle. A motorcycle according to an embodiment of the present invention may be of any other type such as a moped type, an off-road type, a scooter-type or the like.

In the following description, the terms "front", "rear", "left" and "right" respectively refer to front, rear, left and right as seen from a rider of the motorcycle 1. The terms "top"/"up" and "bottom"/"down" respectively refer to top/up and bottom/down in a state where the motorcycle 1 stops on a horizontal plane.

As shown in FIG. 1, the motorcycle 1 includes a vehicle frame 3, a front wheel 5, a rear wheel 6, and an internal combustion engine (engine) 7. The motorcycle 1 further includes a fuel tank 16 supported by the vehicle frame 3, a main seat 18 on which the rider may sit, and a tandem seat 20 on which a passenger may sit.

The vehicle frame 3 includes a head pipe 2 and a main frame 4 extending downward and rearward from the head pipe 2. The head pipe 2 supports a steering shaft (not shown) having a handle 10 secured thereto, such that the steering shaft is pivotable leftward and rightward. The steering shaft is secured to a front fork 11. The vehicle frame 3 further includes a seat frame (not shown) supporting the main seat 18 and the tandem seat 20. The seat frame extends obliquely rearward and upward from a middle portion of the main frame 4, and is located below the main seat 18 and the tandem seat 20.

The front wheel 5 is supported by the front fork 11. The rear wheel 6 is supported by a rear end of the rear arm 12. A front end of the rear arm 12 is swingably supported by the vehicle frame 3 via a pivot shaft 13. The front wheel 5 is a driven wheel, and the rear wheel 6 is a driving wheel driven by the engine 7. The engine 7 and the rear wheel 6 are coupled to each other by a chain 14. The engine 7 is supported by the vehicle frame 3.

The main seat 18 is located to the rear of the fuel tank 16 and above the vehicle frame 3, and is supported by the vehicle frame 3 (seat frame). The tandem seat 20 is located to the rear of the main seat 18 and above the vehicle frame 3, and is supported by the vehicle frame 3 (seat frame).

Figure 2:
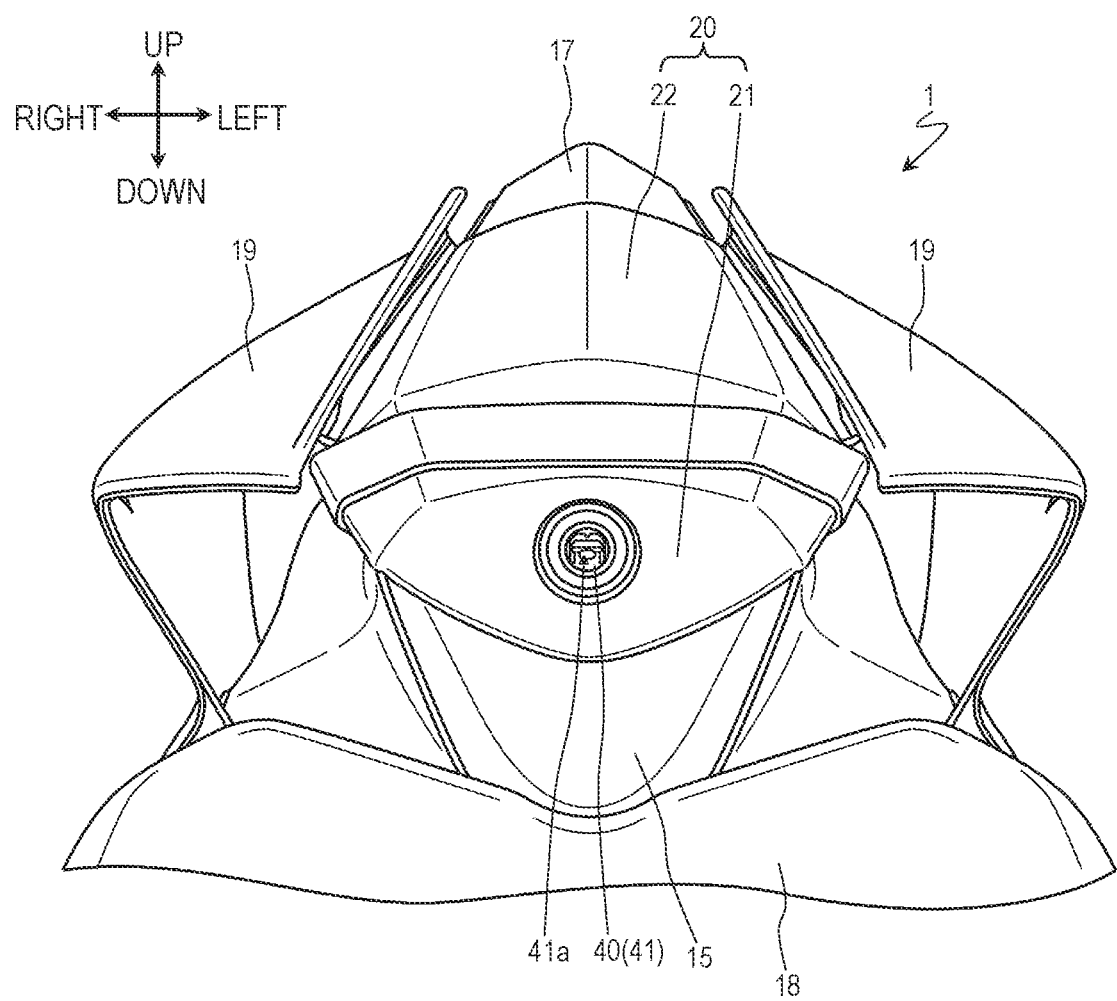
FIG. 2 is a front view of a tandem seat 20 and the vicinity thereof of the motorcycle 1.
Figure 3:
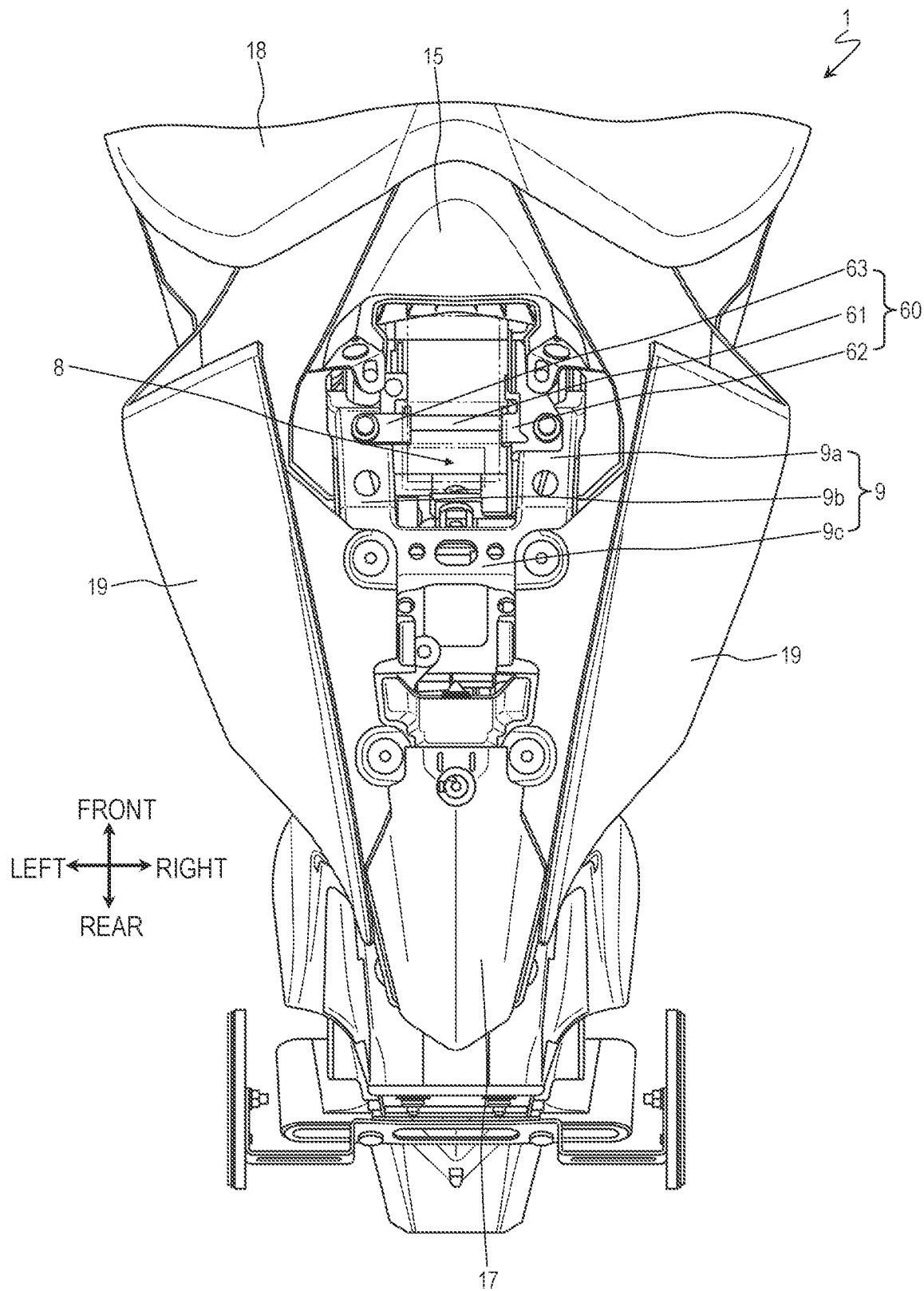
FIG. 3 is a top view of the motorcycle 1 in a state where the tandem seat 20 is removed.
Figure 4:
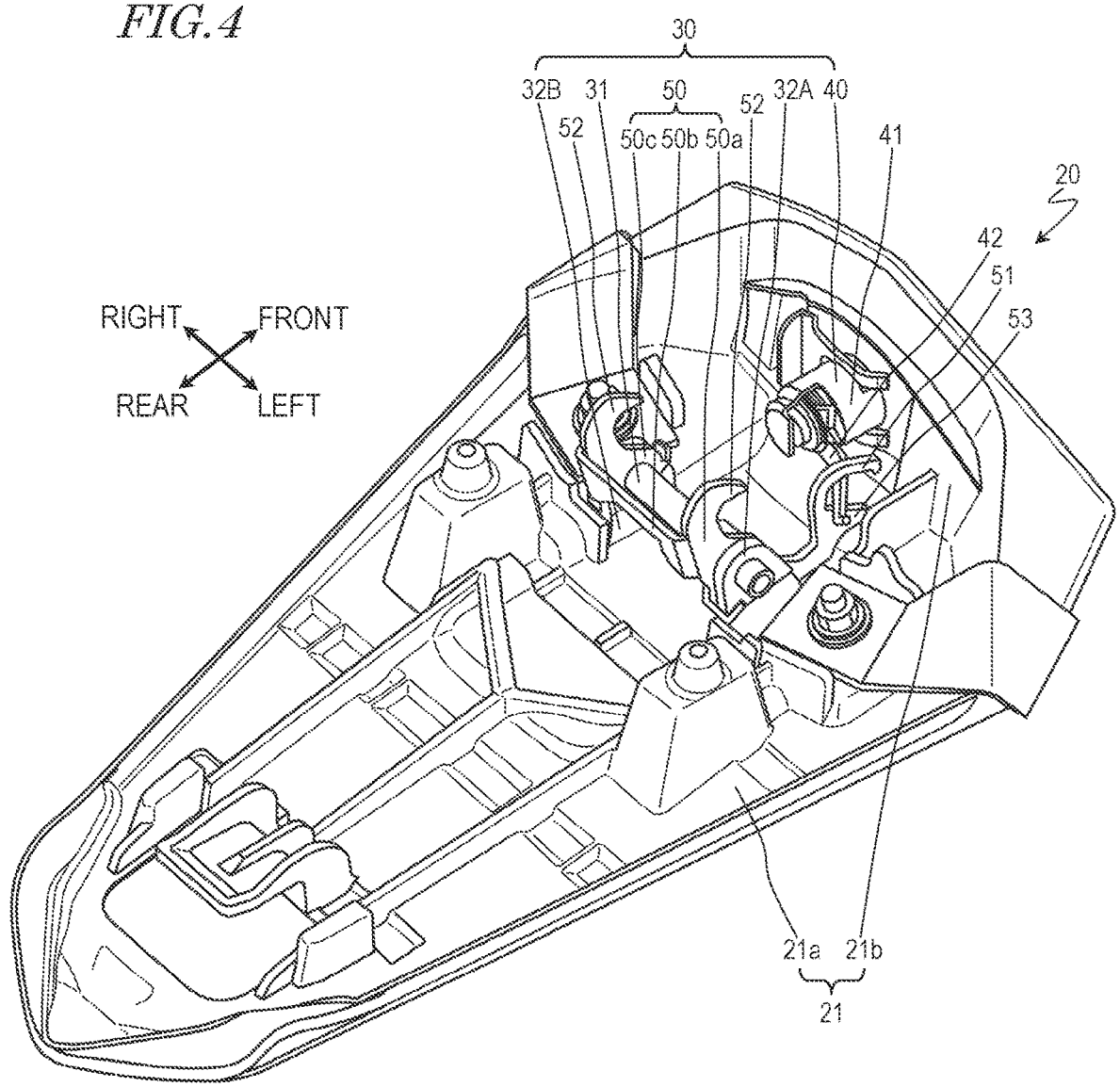
FIG. 4 is a bottom perspective view of the tandem seat 20.

Now, with reference also to FIG. 2, FIG. 3 and FIG. 4, the structure of the motorcycle 1 will be described in more detail. FIG. 2 is a front view of the tandem seat 2 and the vicinity thereof of the motorcycle 1. FIG. 3 is a top view of the motorcycle 1 in a state where the tandem seat 20 is removed. FIG. 4 is a bottom perspective view of the removed tandem seat 20.

As shown in FIG. 1 and FIG. 2, the tandem seat 20 is located above the vehicle frame 3 and to the rear of the main seat 18. A center cover 15 is located below the tandem seat 20, and a rear center cover 17 is located to the rear of the tandem seat 20. A pair of rear side covers 19 are located to both of the two sides of the tandem seat 20.

As shown in FIG. 2 and FIG. 4, the tandem seat 20 includes a bottom plate 21 located at a bottom surface of the tandem seat 20, a cushioning member (not shown) supported by the bottom plate 21, and a cover member 22 covering the cushioning member. The bottom plate 21 includes a main body 21a expanding in a front-rear direction and a left-right direction, and a front wall 21b extending downward from a front end of the main body 21a.

As shown in FIG. 3, an accommodation portion 8 is provided below the tandem seat 20. A top opening of the accommodation portion 8 is covered with the tandem seat 20. The accommodation portion 8 may accommodate a tool box or the like, or an onboard ETC unit or the like. In the state where the tandem seat 20 is removed, a cross member 9 attached to the seat frame is exposed from the opening of the accommodation portion 8. The cross member 9 includes a first front-rear extending portion 9a and a second front-rear extending portion 9b extending in the front-rear direction, and a left-right extending portion 9c extending in the left-right direction and connecting rear ends of the first front-rear extending portion 9a and the second front-rear extending portion 9b to each other.

As shown in FIG. 4, the motorcycle 1 includes a seat lock mechanism 30 attached to a bottom portion of the tandem seat 20. The seat lock mechanism 30 secures the tandem seat 20 such that the tandem seat 20 is detachable from the vehicle frame 3. As shown in FIG. 3, the motorcycle 1 includes a lock portion 60 attached to the vehicle frame 3 in a front portion of the accommodation portion 8. The lock portion 60 is engageable with a part of the seat lock mechanism 30 (engageable with a second hook portion 52 of a hook member 50 described below).

The lock portion 60 includes a cylindrical rod-like rod portion 61 extending in a vehicle width direction (left-right direction), a first bracket portion 62 connected to one end (right end) of the rod portion 61, and a second bracket portion 63 connected to the other end (left end) of the rod portion 61. The lock portion 60 is attached to the vehicle frame 3 via the cross member 9. More specifically, the first bracket portion 62 and the second bracket portion 63 of the lock portion 60 are respectively attached to the first front-rear extending portion 9a and the second front-rear extending portion 9b of the cross member 9.

The seat lock mechanism 30 is located in a front portion of an area below the tandem seat 20. The seat lock mechanism 30 includes a key cylinder 40, the hook member 50, a shaft member 31, a first bracket 32A and a second bracket 32B.

Figure 5A:
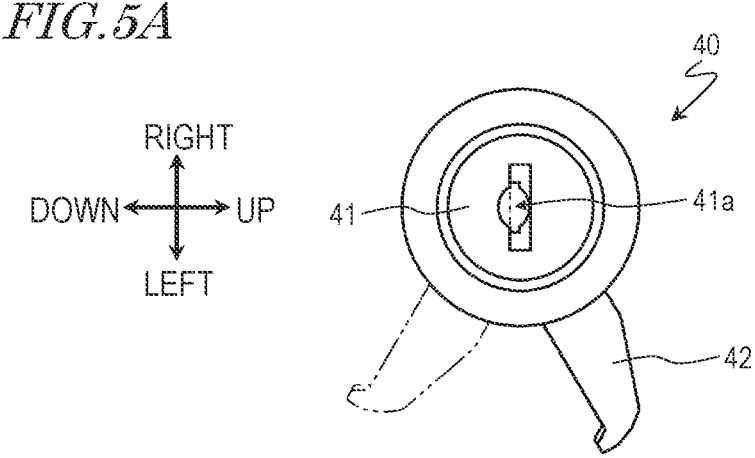
FIG. 5A is a front view of a key cylinder 40.
Figure 5B:
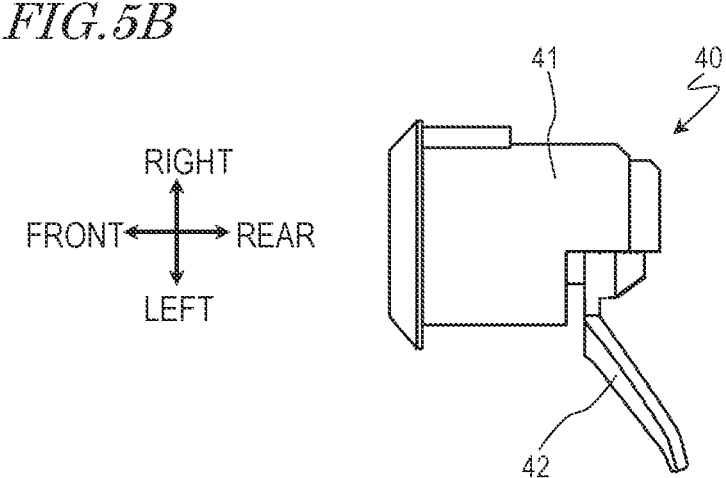
FIG. 5B is a top view of the key cylinder 40.
Figure 5C:
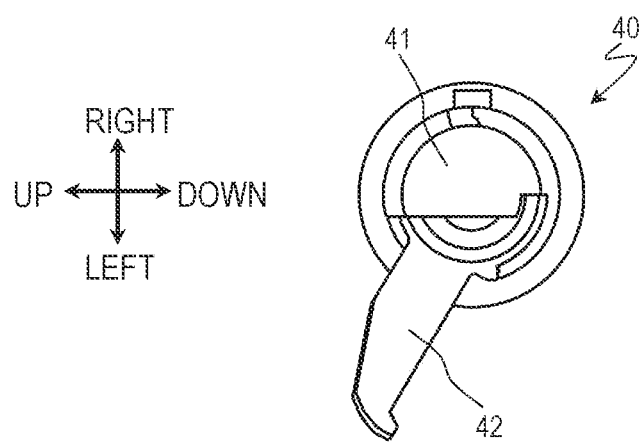
FIG. 5C is a rear view of the key cylinder 40.

As shown in FIG. 2 and FIG. 4, the key cylinder 40 is attached to the front wall 21b of the bottom plate 21. FIG. 5A, FIG. 5B and FIG. 5C are respectively a front view, a top view, and a rear view of the key cylinder 40. As shown in FIG. 5A, FIG. 5B and FIG. 5C, the key cylinder 40 includes a main body 41 and an arm 42.

The main body 41 is generally cylindrical. The main body 41 has a key insertion hole 41a, into which a key may be inserted. The key insertion hole 41a is opened forward (see FIG. 2).

The arm 42 protrudes from the main body 41. The arm 42 is pivotable, with the main body 41 acting as the pivoting center, by a pivoting operation made by the key inserted into the key insertion hole 41a.

Figure 6:
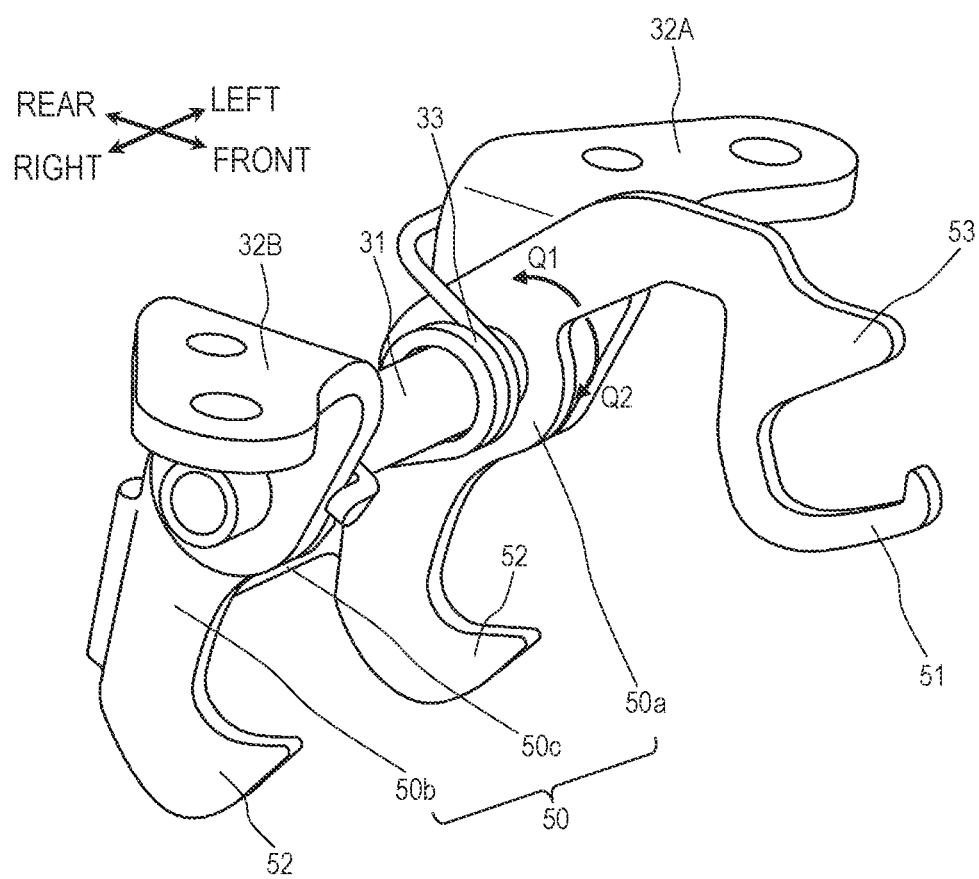
FIG. 6 is a perspective view showing a hook member 50, a shaft member 31, a first bracket 32A and a second bracket 32B of a seat lock mechanism 30.

FIG. 6 is a perspective view showing the hook member 50, the shaft member 31, the first bracket 31A and the second bracket 31B of the seat lock mechanism 30 (i.e., components of the seat lock mechanism 30 other than the key cylinder 40).

As described below, the hook member 50 pivots along the pivoting of the arm 42 of the key cylinder 40. The hook member 50 includes a first hook portion 51 engageable with the arm 42 and at least one second hook portion 52 engageable with the lock portion 60 (two second hook portions 52 in the example shown here).

In the example shown here, the hook member 50 includes a first plate 50a including the first hook portion 51 and one of the second hook portions 52, a second plate 50b located to the right of the first plate 50a and including the other second hook portion 52, and a third plate 50c extending in the left-right direction and coupling the first plate 50a and the second plate 50b to each other. The first hook portion 51 is located at a front end of the first plate 50a. One of the second hook portions 52 is located at a rear end of the first plate 50a, and the other second hook portion 52 is located at a rear end of the second plate 50b. The first plate 50a and the second plate 50b each have a through-hole through which the shaft member 31 is inserted.

The first bracket 32A is located to the left of the first plate 50a of the hook member 50, and the second bracket 32B is located to the right of the second plate 50b of the hook member 50. Namely, the first bracket 32A and the second bracket 32B are located to sandwich the hook member 50. The first bracket 32A and the second bracket 32B each have a through-hole through which the shaft member 31 is inserted. The first bracket 32A and the second bracket 32B are attached to a bottom surface of the tandem seat 20, more specifically, to the main body 21b of the bottom plate 21.

The shaft member 31 is cylindrical, and extends in the left-right direction. A left end of the shaft member 31 is inserted through the through-hole of the first plate 50a and the through-hole of the first bracket 32A. A right end of the shaft member 31 is inserted through the through-hole of the second plate 50b and the through-hole of the second bracket 32B. The hook member 50 pivots with the shaft member 31 acting as the pivoting axis.

A torsion coil spring 33 is attached to the shaft member 31 (in this example, in the vicinity of the left end of the shaft member 31). One end of the torsion coil spring 33 is hooked on the first bracket 32A, and the other end of the torsion coil spring 33 is hooked on the hook member 50. The torsion coil spring 33 produces an urging force that urges the hook member 50 in a direction of arrow Q1.

Figure 7A:
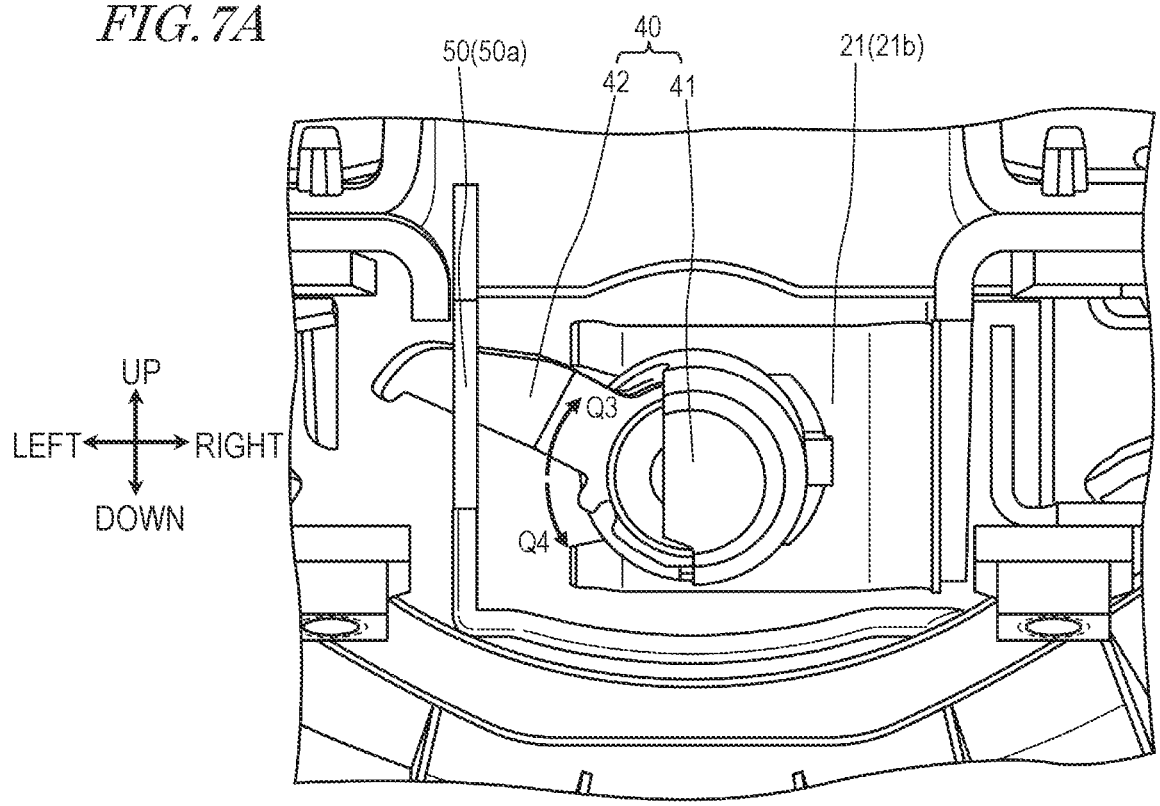
FIG. 7A is a rear view of the key cylinder 40 and the vicinity thereof of the seat lock mechanism 30 in a state where the tandem seat 20 is secured to a vehicle frame 3.
Figure 7B:
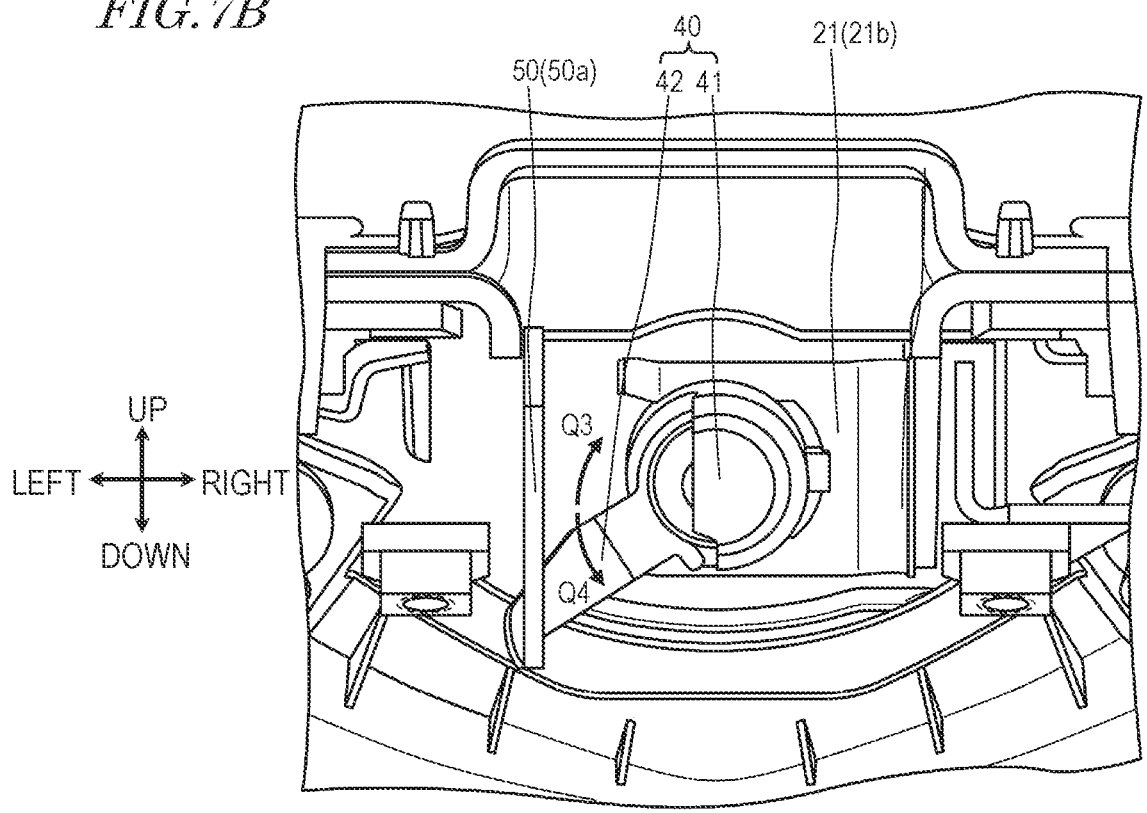
FIG. 7B is a rear view of the key cylinder 40 and the vicinity thereof of the seat lock mechanism 30 in a state where the tandem seat 20 is not secured to the vehicle frame 3.

FIG. 7A and FIG. 7B are each a rear view of the key cylinder 40 and the vicinity thereof of the seat lock mechanism 30. FIG. 7A shows a state where the tandem seat 20 is secured to the vehicle frame 3. FIG. 7B shows a state where the tandem seat 20 is not secured to the vehicle frame 3.

As shown in FIG. 7A, when the arm 42 pivots in a direction of arrow Q3 by a pivoting operation made by the key inserted into the key insertion hole 41a, the hook member 50 rotates in the direction of arrow Q1 in FIG. 6 by the urging force of the torsion coil spring 33, and the second hook portions 52 are put into engagement with the lock portion 60 (more specifically, the rod portion 61 of the lock portion 60). As a result, the tandem seat 20 may be secured to the vehicle frame 3.

By contrast, as shown in FIG. 7B, when the arm 42 pivots in a direction of arrow Q4 by a pivoting operation made by the key, the hook member 50 is pushed by the arm 42 contacting the first hook portion 51 and rotates in a direction of arrow Q2 in FIG. 6, and the lock portion 60 and the second hook portions 52 are disengaged from each other. As a result, the tandem seat 20 may be removed. As can be understood from FIG. 4 and the like, the rotation shaft of the arm 42 and the rotation shaft of the hook member 50 are generally perpendicular to each other.

In this embodiment, as shown in FIG. 4 and FIG. 6, the hook member 50 further includes a pivoting restriction portion 53, which restricts (prevents) the hook member 50 from pivoting in a state where the arm 42 is not pivotable (i.e., in a state where the key is not inserted into the key insertion hole 41a). Specifically, the pivoting restriction portion 53 is a part of the first plate 50a, and is a portion extending to be located on the side opposite to the first hook portion 51 with respect to the arm 42 (see FIG. 4).

Figure 8:
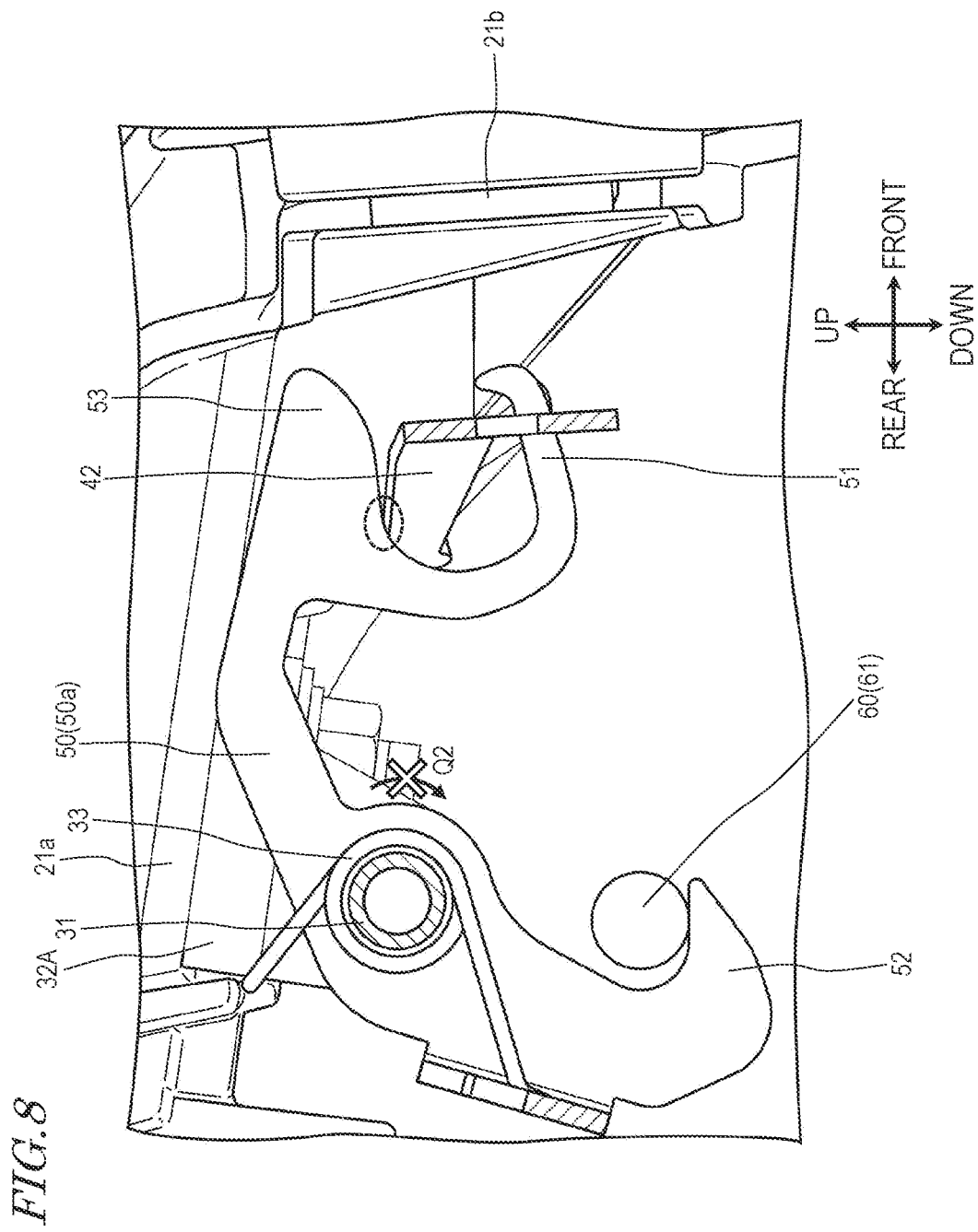
FIG. 8 is a view provided to describe a function of a pivoting restriction portion 53, and shows a state where second hook portions 52 (only one is shown) of the hook member 50 are in engagement with a rod portion 61 of a lock portion 60.

FIG. 8 is a view provided to describe a function of the pivoting restriction portion 53, and shows a state where the second hook portions 52 (only one is shown) of the hook member 50 are in engagement with the rod portion 61 of the lock portion 60. As shown in FIG. 8, even if it is attempted to forcibly pivot the hook member 50 in this state, the pivoting restriction portion 53 extending as described above contacts the arm 42 of the key cylinder 40 (see the portion surrounded by the dotted line in FIG. 8). Therefore, the hook member 50 is restricted from pivoting in the direction of arrow Q2.

As described above, in the motorcycle 1 in this embodiment, the hook member 50 of the seat lock mechanism 30 includes the pivoting restriction portion 53, which restricts the hook member 50 from pivoting in a state where the arm 42 of the key cylinder 40 is not pivotable. Therefore, the hook member 50 may be prevented from being pivoted forcibly with no use of the key. The motorcycle 1 in this embodiment does not require the shape of a component located in the vicinity of the seat lock mechanism 30 to be changed, or to newly provide a component, in order to prevent the forcible pivoting of the hook member 50. Therefore, an increase in the cost or the weight may be suppressed. In addition, the seat lock mechanism 30 is provided on the side of the tandem seat 20, instead of on the side of the vehicle body. Therefore, the accommodation portion 8 is accessible more easily in a state where the tandem seat 20 is removed from the vehicle frame 30, and is usable more effectively. Furthermore, the hook member 50 is structured to pivot, not to slide linearly, along with the pivoting of the arm 42. Therefore, the ratio between the distance from the first hook portion 51 to the pivoting shaft and the distance from the second hook portion(s) 52 to the pivoting shaft may be adjusted, so that the pivoting range of the second hook portion(s) 52 in accordance with the pivoting of the arm 42 is appropriately set. Hence, the second hook portion(s) 52 and the lock portion 60 may be engaged with, or disengaged from, each other in a preferred manner.

Figure 9:
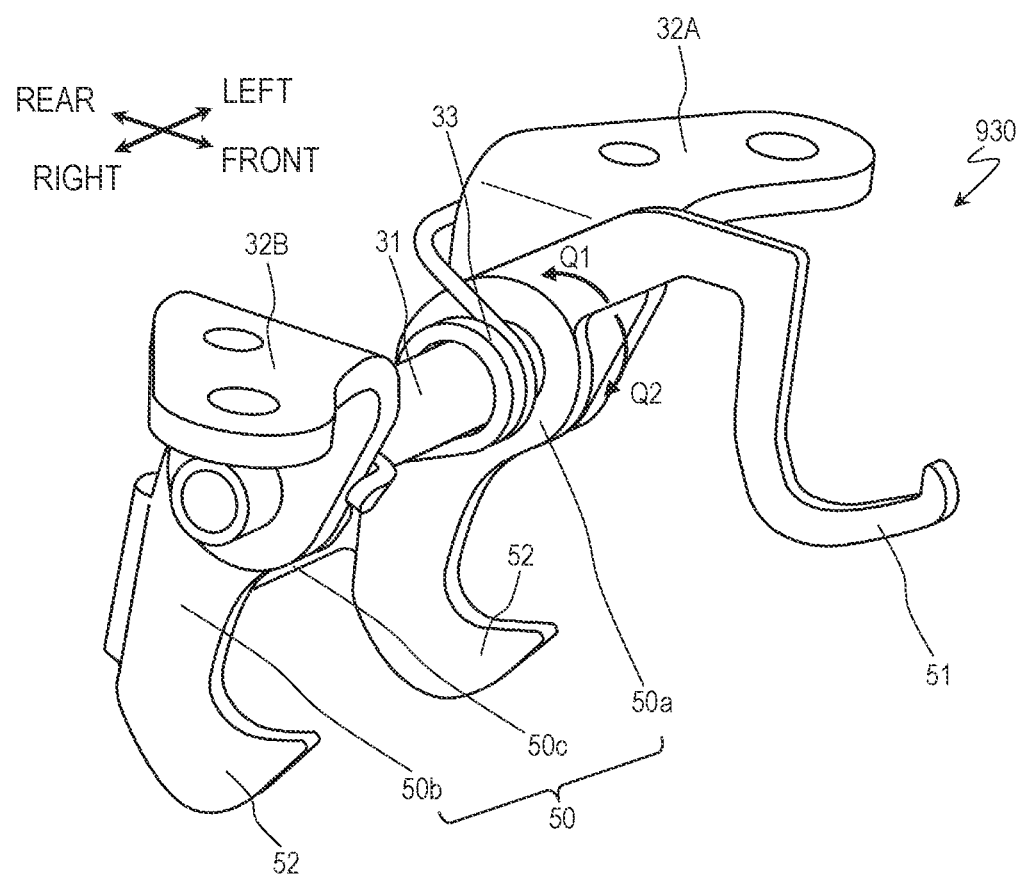
FIG. 9 is a perspective view showing a seat lock mechanism 930 in a comparative example.

FIG. 9 shows a seat lock mechanism 930 in a comparative example. Unlike in the seat lock mechanism 30 in this embodiment, in the seat lock mechanism 930 in the comparative example shown in FIG. 9, the hook member 50 does not include the pivoting restriction portion 53. FIG. 9 does not show the key cylinder 40.

Figure 10:
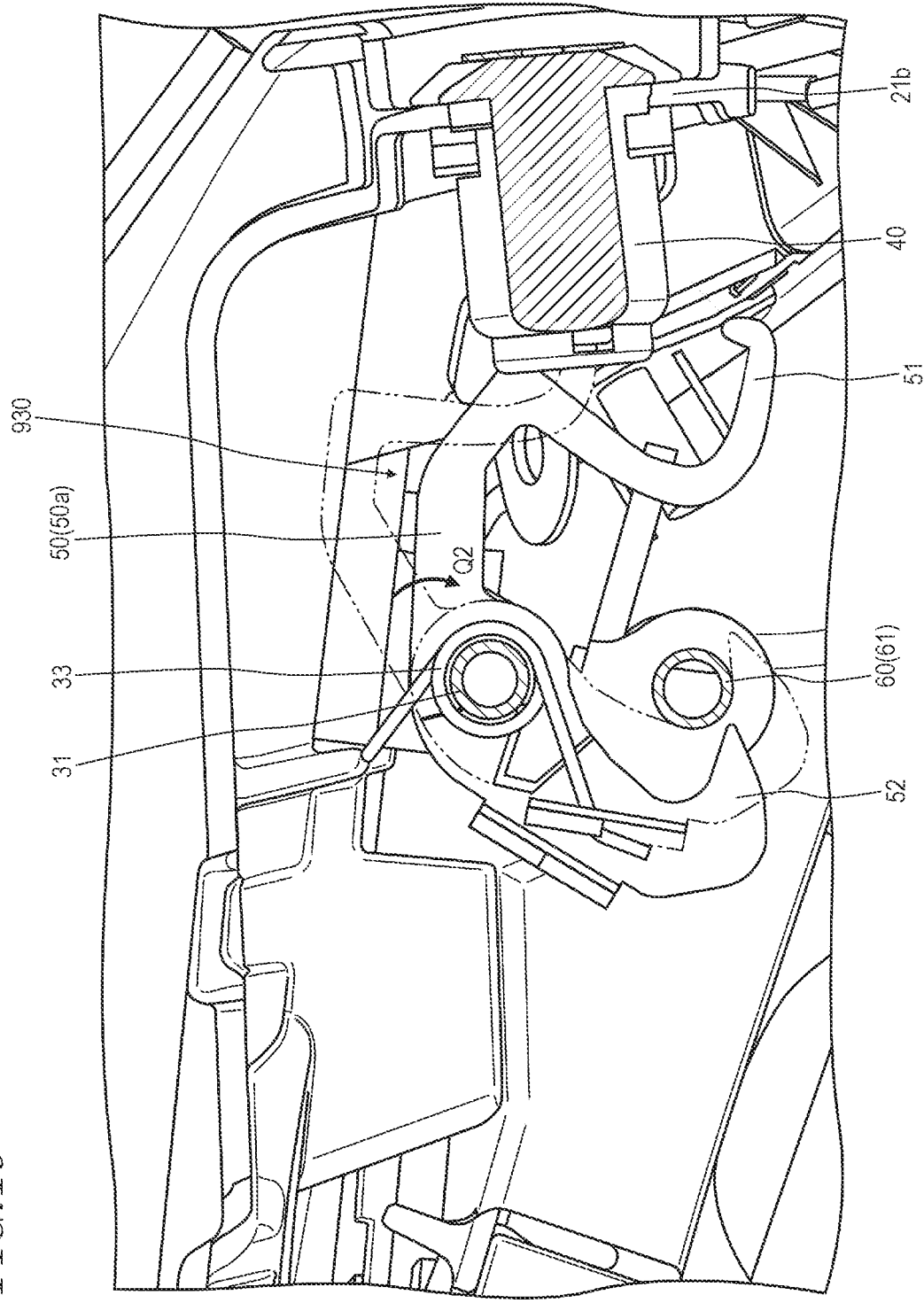
FIG. 10 is a view showing how the hook member 50 of the seat lock mechanism 930 in the comparative example pivots.

As described above, in the seat lock mechanism 930 in the comparative example shown in FIG. 9, the hook member does not include the pivoting restriction portion 53. Therefore, as shown in FIG. 10, there is an undesirable possibility that some tool is inserted into a gap around the seat lock mechanism 930 to pivot the hook member 50 forcibly in the direction of arrow Q2.

By contrast, in the motorcycle 1 in this embodiment, the hook member 50 includes the pivoting restriction portion 53, and therefore, the hook member 50 may be prevented from being pivoted forcibly with no use of the key.

The motorcycle 1 is described as an example of straddled vehicle. The "straddled vehicle" refers to any automatic vehicle on which a rider rides in a straddle manner, and is not limited to a motorcycle. The straddled vehicle may be, for example, an automatic three-wheeled leaning multi wheel (LMW), which changes the advancing direction thereof when being inclined, or an ATV (All Terrain Vehicle) such as a buggy or the like.

As described above, the straddled vehicle 1 according to an embodiment of the present invention includes the vehicle frame 3; the main seat 18 located above the vehicle frame 3; the tandem seat 20 located above the vehicle frame 3 and to the rear of the main seat 18; the accommodation portion 8 provided below the tandem seat 20; the seat lock mechanism 30 attached to a bottom portion of the tandem seat 20, the seat lock mechanism 30 detachably securing the tandem seat 20 to the vehicle frame 3; and the lock portion 60 attached to the vehicle frame 3 in a front portion of the accommodation portion 8, the lock portion 60 being engageable with a part of the seat lock mechanism 30. The seat lock mechanism 30 includes the key cylinder 40 including the main body 41 having the key insertion hole 41a, and the arm 42 protruding from the main body 41, the arm 42 being pivotable, with the main body 41 acting as the pivoting center, by a pivoting operation made by a key inserted into the key insertion hole 41a; and the hook member 50 pivotable along the pivoting of the arm 42 of the key cylinder 40, the hook member 50 including the first hook portion 51 engageable with the arm 42 and at least one second hook portion 52 engageable with the lock portion 60. The hook member 50 further includes the pivoting restriction portion 53 restricting the hook member 50 from pivoting in a state where the arm 42 is not pivotable.

In the straddled vehicle 1 according to an embodiment of the present invention, the hook member 50 of the seat lock mechanism 30 includes the pivoting restriction portion 53, which restricts the hook member 50 from pivoting in a state where the arm 42 of the key cylinder 40 is not pivotable. Therefore, the hook member 50 may be prevented from being pivoted forcibly with no use of the key. The straddled vehicle 1 according to an embodiment of the present invention does not require the shape of a component located in the vicinity of the seat lock mechanism 30 to be changed, or to newly provide a component, in order to prevent the forcible pivoting of the hook member 50. Therefore, an increase in the cost or the weight may be suppressed. In addition, the seat lock mechanism 30 is provided on the side of the tandem seat 20, instead of on the side of the vehicle body. Therefore, the accommodation portion 8 is accessible more easily in a state where the tandem seat 20 is removed from the vehicle frame 30, and is usable more effectively. Furthermore, the hook member 50 is structured to pivot, not to slide linearly, along with the pivoting of the arm 42. Therefore, the ratio between the distance from the first hook portion 51 to the pivoting shaft and the distance from the second hook portion 52 to the pivoting shaft may be adjusted, so that the pivoting range of the second hook portion 52 in accordance with the pivoting of the arm 42 is appropriately set. Hence, the second hook portion 52 and the lock portion 60 may be engaged with, or disengaged from, each other in a preferred manner.

In an embodiment, the pivoting restriction portion 53 is a portion extending to be located on the side opposite to the first hook portion 51 with respect to the arm 42.

Specifically, the pivoting restriction portion 53 may be a portion extending to be located on the side opposite to the first hook portion 51 with respect to the arm 42. When it is attempted to forcibly pivot the hook member 50, the pivoting restriction portion 53 extending as described above contacts the arm 42 of the key cylinder 40, and therefore, the hook member 50 may be restricted from pivoting.

According to an embodiment of the present invention, a straddled vehicle capable of preferably preventing a misconduct to the seat lock mechanism (unpermitted operation on the seat lock mechanism by somebody having no key) without being increased in the cost or the weight may be provided. An embodiment of the present invention is preferably usable for any of various types of straddled vehicles.

What is claimed is:

1. A straddled vehicle, comprising:
a vehicle frame;
a main seat located above the vehicle frame;
a tandem seat located above the vehicle frame and to the rear of the main seat;
an accommodation portion provided below the tandem seat;
a seat lock mechanism attached to a bottom portion of the tandem seat, the seat lock mechanism detachably securing the tandem seat to the vehicle frame; and
a lock portion formed in a front portion of the accommodation portion, the lock portion being attached to the vehicle frame and being engageable with the seat lock mechanism, wherein
the seat lock mechanism includes:
a key cylinder including
a main body having a key insertion hole, for a key to be inserted therein, and
an arm protruding from the main body, the arm being pivotable around the main body by a pivoting operation made by the key inserted into the key insertion hole, and
a hook member configured to pivot along with the pivoting of the arm of the key cylinder, the hook member including
a first hook portion engageable with the arm,
at least one second hook portion engageable with the lock portion, and
a pivoting restriction portion configured to restrict the hook member from pivoting in a state where the key insertion hole does not have the key inserted therein.

2. The straddled vehicle of claim 1, wherein the pivoting restriction portion is a portion extending from the first hook portion, so as to be located on a side opposite to the first hook portion with respect to the arm.

* * * * *